J. F. WOODMANSEE.
TITLE RECORD.
APPLICATION FILED JAN. 31, 1917.

1,386,216.

Patented Aug. 2, 1921.

| MANN'S SUBDIVISION | | | Part of S E 1/4 Section 9 Town 6 North of Range 22 E, 17th Ward, City of Milwaukee. | | | |
|---|---|---|---|---|---|---|
| Block 7 | | | *I* | | | |
| Lot 6 *J* | 7 *J* | 8 *J* | 9 | 10 | 11 | *J* 12 |
| *K* | *K* | *K* | 786333D<br>797705M<br>798101A<br>798426PR<br>798654R<br>798752M<br>798954LP<br>799675ML | | | *K* |

*Fig. 2.*

| 786335 | Grantor | *A* | | Grantee | 786335 |
|---|---|---|---|---|---|
| 786334 | Grantor | *A* | | Grantee | 786334 |
| 786333 | Grantor | *A*   *A'* | | Grantee | 786333 |

| Warranty Deed | Frank C. Otto  (Single) | Frank W. Sherman  & |
|---|---|---|
| Dated 11 Apr 12 | by James R. Jones his Att'y in fact | Elizabeth C. Sherman, his wife as joint tenants, and |
| | *C*   *C'* | not as tenants in common |
| Ackn 11 Apr 12 | In consideration of $6000 | and to the survivor of them |
| | | *D* |
| Filed 15 Apr 12 | Lot 9 in Blk 7 in Mann's Subd, in the S E 1/4 of Section 9 | |
| 9-55 | Town 6 N of Range 22 E, in the 17th Ward, cite of Milwaukee | |
| | Full Covenant of Warranty | |
| *B* | *B'* | |
| | | *E* |

WITNESSES:

INVENTOR
John F. Woodmansee
BY Erwin & Rhodes
ATTORNEYS.

J. F. WOODMANSEE.
TITLE RECORD.
APPLICATION FILED JAN. 31, 1917.

1,386,216.

Patented Aug. 2, 1921.
4 SHEETS—SHEET 2.

*Fig. 3.*

| 920430 | Grantor | A | | Grantee | 920430 |
|---|---|---|---|---|---|
| | J. C. Outan | | | | |
| 890426 | Grantor | A | | Grantee | 890426 |
| | Frank C. Otto | | | | |
| 786333 | Grantor | A | A' | Grantee | 786333 |
| Warranty Deed | Frank C. Otto (Single) by James R. Jones his Att'y in fact | | | Frank W. Sherman & Elizabeth C. Sherman, his wife as joint tenants, and not as tenants in common and to the survivor of them | |
| Dated 11 Apr 12 | | | | | |
| | | C | C'— | | |
| Ackn 11 Apr 12 | In consideration of $6000 | | | | |
| | | | | | D |
| Filed 15 Apr 12 9-55 | Lot 9 in Blk 7 in Mann's Subd, in the S E 1/4 of Sec 9 Town 6 N of Range 22 E, in the 17th Ward, city of Milwaukee | | | | |
| B | Full Covenant of Warranty | | | | |
| B'— | | | | E | |

*Fig. 4.*

| 72492 | Grantor | A | | Grantee | 72492 |
|---|---|---|---|---|---|
| 823456 | Grantor | A | | Grantee | 823456 |
| | | | | Jno. S. Sherman | |
| 786333 | Grantor | A | A' | Grantee | 786333 |
| Warranty Deed | Frank C. Otto (Single) by James R. Jones his Att'y in fact | | | Frank W. Sherman & Elizabeth C. Sherman, his wife as joint tenants, and not as tenants in common and to the survivor of them | |
| Dated 11 Apr 12 | | | | | |
| | | C | C'— | | |
| Ackn 11 Apr 12 | In consideration of $6000 | | | | |
| | | | | | D |
| Filed 15 Apr 12 9-55 | Lot 9 in Blk 7 in Mann's Subd, in the S E 1/4 of Sec 9 Town 6 N of Range 22 E, in the 17th Ward, city of Milwaukee | | | | |
| B | Full Covenant of Warranty | | | | |
| B'— | | | | E | |

WITNESSES:

INVENTOR
John F. Woodmansee
BY Orwin T Wheeler
ATTORNEYS.

J. F. WOODMANSEE.
TITLE RECORD.
APPLICATION FILED JAN. 31, 1917.

1,386,216.

Patented Aug. 2, 1921.
4 SHEETS—SHEET 3.

Fig. 5.

| 799675 | Grantor (Owner) A | A' Grantee (Claimant) 799675 |
|---|---|---|
| Mechanics Lien<br>Dated 16 Jun 16<br><br>Filed 16 Jun 16<br>8-30<br><br>B<br>B' | Frank W. Sherman &<br>Elizabeth C. Sherman, his wife<br>C  C'<br>$567.84 Last date of labor 14 May 16<br>Notice to Owner served 30 May 16<br>Lot 9 in Blk 7 in Mann's Subd, in the S E 1/4 of Sec 9<br>Town 6 N of Range 22 E in the 17th Ward City of Milwaukee | George Harrington<br>(Carpenter contractor)<br>D<br><br><br><br>Frank E. Jones,<br>Atty<br>E |

Fig. 6.

| 798954 | Grantor (Defdts) A | A' Grantee (Pltffs) 798954 |
|---|---|---|
| Lis Pendens<br>Dated 11 Nov 15<br><br><br>Filed 11 Nov 15<br>3-15<br><br>B<br>B' | Frank W. Sherman &<br>Elizabeth C. Sherman, his wife<br>C  C'<br>CIRCUIT COURT—MILWAUKEE COUNTY<br>Notice is hereby given that the plaintiff has begun an<br>action for foreclosure of Mtg filed in the office of the Register<br>of Deeds of Milw Co, 12 Aug 15 as No 798752; That the suit<br>number in said court is No 56,342.<br>Lot 9 in Blk 7 in Mann's Subd, in the S E 1/4 of Sec 9<br>Town 6 N of Range 22 E, in the 17th Ward, city of Milwaukee | Henry A. Morris<br>general guardian of<br>Frank Morris, infant<br>D<br><br><br><br><br>Frank R. Smith,<br>Pltff's Atty<br>E |

Fig. 7.

| 798752 | Grantor A | A' Grantee 798752 |
|---|---|---|
| Mortgage<br>Dated 1 Aug 15<br>Ackn 11 Aug 15<br><br>Filed 12 Aug 15<br>4-10<br><br>B<br>B' | Frank W. Sherman &<br>Elizabeth C. Sherman, his wife<br>(Sgd F.W. Sherman)<br>(Sgd Lizzie Sherman)<br>C  C'<br>Lot 9 in Blk 7 in Mann's Subd, in the S E 1/4 of Sec 9<br>Town 6 N of Range 22 E, in the 17th Ward, city of Milw<br>$500 as per Note<br>Mortgagors to pay taxes on Mtg interest<br>Covenant | Henry A. Morris<br>General guardian of<br>Frank Morris, infant<br>D<br><br><br><br><br>E |

WITNESSES:

INVENTOR
John F. Woodmansee
BY Erwin & Wheler
ATTORNEYS.

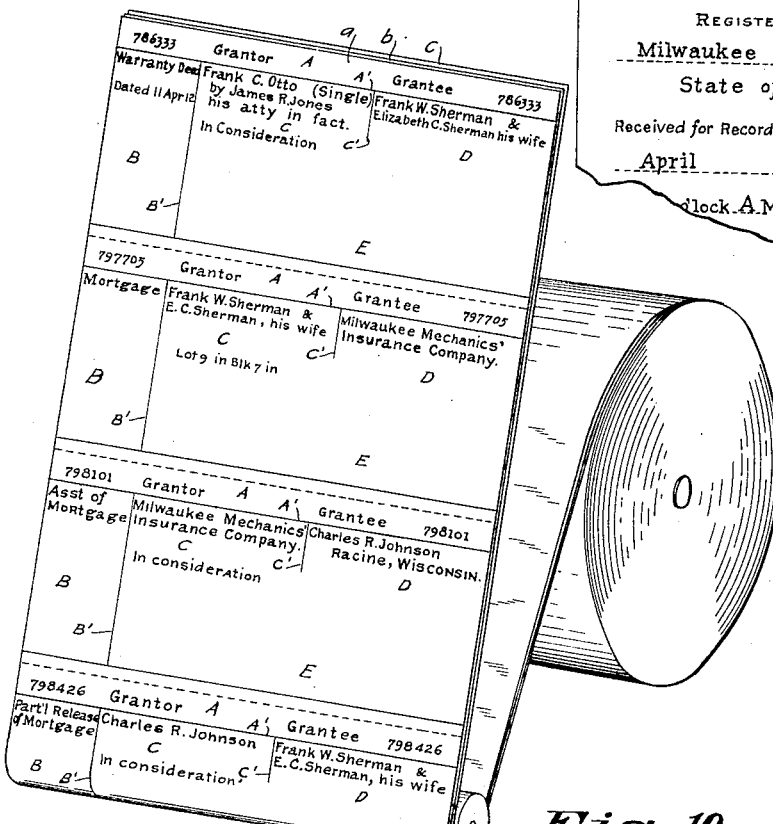

UNITED STATES PATENT OFFICE.

JOHN F. WOODMANSEE, OF MILWAUKEE, WISCONSIN.

TITLE-RECORD.

1,386,216.     Specification of Letters Patent.     Patented Aug. 2, 1921.

Application filed January 31, 1917. Serial No. 145,605.

*To all whom it may concern:*

Be it known that I, JOHN F. WOODMANSEE, citizen of the United States, residing at Milwaukee, county of Milwaukee, and State of Wisconsin, have invented new and useful Improvements in Title-Records, of which the following is a specification.

My invention relates to improvements in title records with particular reference to that class of records which relates to documents affecting the title to real estate.

The object of my invention is to provide means for dispensing with the expensive and cumbrous system of recording instruments and provide, in substitution therefor, a simple and reliable method which can be used, if desired, as a continuation of the method or system heretofore in common use, and by means of which a complete and accurate history of the title to any given tract, may be prepared in a few moments time, which history will cover the entire period of use of my improved method. I propose to not only do away with the necessity of recording the instruments in books as heretofore provided for such purposes, but also to avoid the necessity of preparing expensive abstracts and of keeping books of abstracts, the method of keeping the records being such as to produce manifold sets of abstracts relating to every instrument that affects the title to real estate.

A further object of my invention is to provide means whereby a set of simultaneously produced or manifold records or abstracts may be so arranged that an investigator may ascertain the title of any given tract by consulting one set of such manifold records, and may also, with equal facility, trace either the holdings or the conveyances of any person, the grants to such person being obtained from one set of records, and the grants by him to others being ascertained from another set of duplicate or like records differently arranged as hereinafter described.

My invention also contemplates the preservation of original instruments or certified copies thereof in a permanent record, each instrument being marked for identification with a serial number applied when it is filed, and said numbers being also used in the preparation of the manifold records above referred to, whereby each instrument may not only be identified but instantly located from any one of a manifold set of abstract records thereof.

My invention further contemplates the keeping of all instruments (or certified copies thereof) affecting the title to real estate in any county or territorial unit, in one office together with the manifold abstract records above referred to, whereby the investigator may ascertain all pertinent facts with reference to judgments, *lis pendens*, etc., simultaneously with the investigation of the records as to deeds, mortgages, etc.

In the drawings:—

Figure 1 is a view of one page of a tract index book, relating to one set of lots or territorial tract of which records are being kept in accordance with my improved method.

Fig. 2 is a similar sectional view of one of the drawers of a general abstract file exposing one of the abstract cards in full and with two of the succeeding cards raised to expose their upper margins and indicate the serial arrangement of the cards in the file.

Fig. 3 is a similar sectional view of one of the drawers of a grantor's abstract file showing portions of the division cards, and also showing a duplicate of the card fully illustrated in Fig. 2, said card and its duplicate being members of a manifold set simultaneously made. In Fig. 3 two of the succeeding cards are also raised to expose their upper portions and indicate the arrangement of the cards in the file.

Fig. 4 is a similar view of one of the drawers of a grantee's abstract file employed in connection with my improved method, in which the most largely exposed abstract card is also a member of the manifold set of which the two other members are exposed in Figs. 2 and 3.

Fig. 5 is a detail view of one of a set of abstract cards relating to a mechanic's lien.

Fig. 6 is a similar view showing a card relating to a notice of *lis pendens*.

Fig. 7 is a similar view relating to a mortgage.

Fig. 8 is a fragmentary view of a deed to which a serial number has been applied, in accordance with my improved method.

Fig. 9 is a detail view of a set of continuous strips of paper properly ruled and subdivided, and adapted to be separated into sets of cards or abstract slips after the manifold operation of printing the abstract of any given instrument thereon has been completed.

Fig. 10 is a view of a fragment of a tract index page, showing a slight modification in the form of the blank disclosed in Fig. 1.

Like parts are identified by the same reference characters throughout the several views.

In carrying out my improved method I provide a filing system under the direction of one officer, or set of officers, instructed to receive and file all instruments, or certified copies thereof, bearing upon or affecting the titles to real estate. Each instrument as received to have a serial number conspicuously stamped thereon. And all instruments, regardless of their character, to be filed in serial order. If the parties interested desire, the official in charge will furnish them with certified copies of the instruments filed, but original instruments are to be filed wherever possible, in order that they may be inspected as to signatures, interlineations, etc., should occasion require.

Upon the filing of each instrument an abstract is immediately prepared in manifold. This may be done by any of the well known manifolding processes, such, for example, as the preparation of a typewritten ribbon copy and a set of carbon copies. These abstracts are prepared in card or ticket form, as illustrated in Figs. 2, 3 and 4. Each of the cards or tickets is provided with an upper marginal portion A, and the serial number given to the filed instrument is printed (typewritten) in this marginal space at both ends thereof. Said number therefore appearing near each upper corner of the card. A ruled line A' separates this marginal portion of the card from the remainder, and the portion below this ruled line is subdivided by vertical lines B' and C' to provide spaces B, C, D and E. The space C is reserved for the name of the grantor, or grantors. The space D is reserved for the name, or names, of the grantee, or grantees. The space E occupies the body of the card below the spaces C and D, and at the right at the space B, and this is reserved for an abstract or digest of the contents of the instrument. The space B extends from the marginal portion A at the top of the card to the bottom along the left hand end, and I print in this space the title of the instrument, the date of execution, the date of filing, and any other dates relating thereto of which a record is desired.

In transcribing and printing records it has heretofore been customary to place the name of the grantee below the name of the grantor in the form of a title, but I have discovered that by my improved method of placing the name of the grantor in such a position that it may be associated with the left hand serial number, and placing the name of the grantee in a position to be associated with the right hand serial number I am enabled, by manifolding the cards, to simultaneously produce a set of abstract cards, each member of which is exactly like the others, except possibly as to color. And I am further enabled to arrange one card of each set in a file wherein the cards are all in the serial order of the numbers printed in space A, as above described. Further, that another member of the manifold set of cards may be arranged with corresponding members of other sets in a grantor abstract file wherein the cards are associated or grouped in accordance with the initial letter, or letters of the grantors' names. Similarly a grantee abstract file may be composed of the third members of the respective manifold sets grouped in accordance with the initial letter, or letters, of the grantees' names.

There are a comparatively few instances in which grantors, or grantees, having different surnames are mentioned in the same instrument. In such cases additional abstract cards, of similar character and in manifold sets, may be prepared for as many different grantors or grantees as may be named, until the name of each grantor and each grantee appears at the top in the cards of one set. These triplicate sets employed for this purpose may be printed upon colored paper, if desired, whereby they may be readily distinguished from the original set in which the grantor's and grantee's names appear in the order in which they appear in the instrument of which the cards are abstracts. If desired, the colored paper cards may be employed simply as "reference cards", containing nothing more than the name of the additional grantor (or grantee), and a reference to the name of the grantor (or grantee) appearing first upon the cards composing the main set, in which the names appear in the order in which they appear in the instrument.

*Tract index file.*

In addition to the abstract cards printed in manifold, as above described, a tract index, preferably in book form, is also prepared which contains index pages (or cards) classified in accordance with territorial divisions and subdivisions. One of these pages is illustrated in Fig. 1 as representing lots 6 to 12 inclusive in block 7 in Mann's subdivision, constituting a part of the SE ¼ of section 9, town 6, north of range 22 E, 17th ward, city of Milwaukee. This record being applicable for use in the county of Milwaukee and State of Wisconsin.

It will be observed that the upper marginal portion of the pages of this book is subdivided by horizontal rule lines into a space H adapted to receive the title of the subdivision and a statement showing the portion of the section, town, or range of towns, into which the State is divided, and also a reference to the ward and city, if the property is located within a city. Below the space H another space I is provided for a more specific description of the location of the property. The description in this space is generic to all of the property listed on the page, but being also specific with reference to the matter contained in the space H. Below the bottom line bounding this space there is a third horizontally extending space subdivided by vertical lines extending to the bottom of the page, thereby providing columns K (or column receiving spaces) headed by spaces J to receive lot numbers or other designations, as indicating the smallest units into which the tract represented by the card is subdivided. In abstracting any instrument, as above described, and in connection with the filing of such instrument, the serial number applied to the instrument is also entered upon the tract index with reference to each lot (or other subdivision of the tract) mentioned in the instrument.

By preparing a tract index, as above described, in which each unit of a tract has an appropriately designated space provided for in the index, I am enabled to enter in such space the serial number of every instrument filed in which such unit is mentioned, in any manner calculated to affect the title thereof. Therefore by examining the tract index file with reference to any given lot, subdivision or other territorial unit, I am enabled to instantly secure a list of all instruments filed which might affect the title thereto. The list comprises merely the serial number, but by turning to the general abstract file, above described, where all of the abstract cards are arranged in serial order, I am able to promptly locate the abstract cards bearing such serial number, and can thus quickly obtain a complete history of the title to that specific piece of property from the time of the adoption of my method to the date of the examination.

Abbreviations are preferably employed in connection with the serial numbers as given on the tract index, whereby the character of each instrument is indicated. The investigator is therefore informed with reference to each serial number, whether the instrument to which it relates is a deed, a mortgage, a *lis pendens*, lien, judgment or other instrument affecting the title. This makes it unnecessary for him to examine all of the abstract cards if he is investigating with reference to only one of the instruments, or with reference to instruments of a particular class, for example, if the only purpose is to examine the cards with reference to *lis pendens* the investigator will merely take the serial numbers having the letters L. P. printed in connection therewith.

It will be understood that inasmuch as the instruments on file also bear the serial numbers and are arranged in serial order the investigator may, with almost equal facility, be referred by the tract index to the instruments themselves, although it will, of course, take longer to inspect the contents of each such instrument than will be required to inspect the general abstract file thereof. In either case, however, the instrument, or the card representing it, is located by means of the serial number, whereas in the grantor or grantee abstract files the property and the instruments are located in the first instance from the name of the party concerning whom the investigator desires information.

It is an exceedingly important feature of my invention that by my improved method, I am able, simultaneously, and with very slight additional labor, to produce not only a general abstract file relative to the instruments in the order in which they are filed, but also a grantor abstract file and a grantee abstract file, whereby the land holding record of any individual may be quickly traced without reference to any specific tract. This has never been done heretofore, and such an investigation has never been possible, except by a long and laborious examination of ponderous volumes of title records, and equally ponderous volumes of indexes thereto in which the name of any given individual may appear in a considerable number of different volumes. In my improved system, however, the name, in each case, is brought into the same group, regardless of the date at which each instrument executed by him was filed.

My improved system further does away with the expensive and prolonged labor of transcribing the contents of instruments into record books such as are ordinarily kept for that purpose. The preparation of the manifold abstract cards requires a much less expenditure of time and effort, and errors are less likely to occur than in the transcription of the entire instrument. Further, inasmuch as the abstract files are prepared in connection with the filing of each instrument, the investigator is enabled to bring the history of the title up to the date of the investigation in absolutely complete form. Further, it is possible for the registrar to maintain a private file of abstract cards from which any cards which have been fraudulently withdrawn from the other files may be reproduced and replaced therein, thereby avoiding the possibility of fraud.

In the foregoing description I have used the term "card" as a convenient designation for the individual abstract of any given instrument. The character of the material used, whether of cardboard or of ordinary paper or other material upon which the record may be printed or impressed, is immaterial, and the term "card" is intended to apply to any and all kinds of sheets of material adapted for this purpose. One feature of my improved method is to be found in the fact that I am able to employ a continuous strip of paper (or set of continuous strips) separated by ruled lines and tearing lines into cards of the character above described. The continuous strips of paper being fed as required into the typewriting or recording machine, and subsequently severed along the tearing lines to produce the so-called "cards." In this manner I avoid the labor of placing the cards separately in the record producing machine, the paper strips being fed from rolls directly into the machine progressively. A set of these continuous strips $a$, $b$, $c$, respectively is illustrated in Fig. 9.

It will be understood that in case any one of the so-called cards should be found insufficient to contain a complete abstract of any given instrument, it is merely necessary to continue the abstract upon the next set of cards. The second set of cards when so used will preferably have the word "Continuation", or an abbreviation thereof, printed at the top, and it will, of course, bear the same serial number as the card or set of cards immediately preceding.

I claim:—

1. In a system of records of real estate titles, a set of serially numbered manifold abstract cards, each having the grantor's name at one end, and the grantee's name at the other end, each card containing an abstract of one instrument affecting the title, and each having at both ends near the upper margin, an identifying designation of the instrument to which the abstract relates, in combination with a tract index containing entitled subdivisions, each provided with the serial numbers of all cards containing matter relating to titles and property in such subdivisions.

2. In a system of records of real estate titles, a multiple series of cards, each serially numbered, and each card being one of a set bearing like serial numbers, and arranged with one card of each set in each series, said cards being printed in manifold, and each having near the top thereof, the grantor's name at one end and the grantee's name at the other end, and each card in each set containing an abstract of one instrument affecting the title to a piece of real estate, also designated on said card, the serial number on each of said cards corresponding with the serial number of the instrument to which said card relates.

3. In a system of records of real estate titles, a multiple series of serially numbered abstract cards, of which each card is one of a set bearing like serial numbers, said cards being prepared in manifold sets, and arranged with one card of each set in each series, each card bearing, near the top thereof, the grantor's name at one end and the grantee's at the other end, each card of each set also containing an abstract of one instrument affecting the title to a piece of real estate, designated on said card, the serial number on each of said cards corresponding with the serial number of the instrument to which said card relates, and said cards being classified in one of said series in the alphabetical order of the grantors' names, and in another of said series in the alphabetical order of the grantees' names.

4. In a system of records of real estate titles, a multiple series of cards, each containing serially numbered abstract cards, of which each card is one of a set, printed in manifold with serial numbers, and adapted to be arranged with the cards of each set in separate receptacles, each card bearing, near the top thereof, the grantor's name at one end and the grantee's at the other end, together with words indicative of the "grantor" and "grantee" near the respective ends of the card, and each card containing an abstract of one instrument affecting the title to a piece of real estate, also designated on said card, the serial number on each of said cards corresponding with the serial number of the instrument to which said card relates, and each of said cards containing a designation identifying the character of the instrument to which the card relates, and another series of cards provided with tract designations, and each containing the serial numbers of all cards in the first mentioned series which contain abstracted matter relating to the respective tract designations.

In testimony whereof I affix my signature in the presence of two witnesses.

JOHN F. WOODMANSEE.

Witnesses:
O. C. WEBER,
ALICE J. McKERIHAN.